United States Patent
Boemler

(10) Patent No.: US 11,546,534 B2
(45) Date of Patent: Jan. 3, 2023

(54) IMAGER HAVING BACKGROUND SIGNAL REMOVAL

(71) Applicant: Raytheon Company, Waltham, MA (US)

(72) Inventor: Christian M. Boemler, Lompoc, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/188,869

(22) Filed: Mar. 1, 2021

(65) Prior Publication Data

US 2022/0279138 A1    Sep. 1, 2022

(51) Int. Cl.
| H04N 5/33 | (2006.01) |
| H04N 5/361 | (2011.01) |
| H04N 5/378 | (2011.01) |

(52) U.S. Cl.
CPC .............. H04N 5/361 (2013.01); H04N 5/33 (2013.01); H04N 5/378 (2013.01)

(58) Field of Classification Search
CPC ............... H04N 5/378; H04N 5/37455; H04N 5/37452; H04N 5/33; H04N 5/332; H04N 5/353; H04N 5/37206; H04N 5/3742; H04N 5/3745; H04N 5/35509; H04N 5/3559; H04N 5/2351; H04N 5/35527; H04N 5/379; H04N 5/2354
USPC ........................................................ 348/164
See application file for complete search history.

(56) References Cited

U.S. PATENT DOCUMENTS

| 2006/0251428 A1* | 11/2006 | Gieseler ................. H03K 5/082 398/189 |
| 2009/0015521 A1* | 1/2009 | Fish ..................... G09G 3/3241 315/169.3 |
| 2009/0310003 A1* | 12/2009 | Collins .............. H04N 5/35518 348/308 |
| 2010/0218204 A1* | 8/2010 | Shimizu ................... G01J 1/46 250/214 SW |
| 2016/0246409 A1* | 8/2016 | Yang ................... G09G 3/3225 |
| 2018/0376082 A1* | 12/2018 | Liu ...................... H01L 27/1461 |
| 2021/0055860 A1* | 2/2021 | Kim ................... G02F 1/13338 |
| 2021/0226638 A1* | 7/2021 | Wahl ..................... H03K 21/38 |

OTHER PUBLICATIONS

Stoppa et al., "Novel CMOS Image Sensor with a 132-Db Dynamic Range;" Proceedings of the IEEE Journal of Solid-State Circuits, Volo. 37, No. 12; Dec. 2002; 7 Pages.

* cited by examiner

*Primary Examiner* — Masum Billah
(74) *Attorney, Agent, or Firm* — Daly, Crowley, Mofford & Durkee LLP

(57) ABSTRACT

Methods and apparatus for an imaging sensor having background subtraction including integrating photocurrent on a first capacitor, and, after a voltage on the first capacitor reaches a threshold, directing the photocurrent to a second capacitor. The first capacitor can be reset. This can be repeated a given number of times until a value on the second capacitor is read out.

20 Claims, 6 Drawing Sheets

IMAGER HAVING BACKGROUND SIGNAL REMOVAL

FIELD OF THE DISCLOSURE

The present disclosure relates to sensors, and more particularly, to imaging sensors.

BACKGROUND

As is known in the art, some conventional sensors, such as infrared (IR) sensors have a relatively small scene signal in addition to a persistent parasitic background signal. The background signal can be caused by pixel dark current, emission from Dewar/optics, and the like. The background signal may be especially large for a camera in airborne vehicles.

To be able to distinguish a small signal on top of a parasitic background signal, some known imagers implement a high full well that can accommodate both background and signal without saturating. As pixel geometries shrink, the capacitance, and therefore the maximum full well, also shrinks, so as to reduce the ability of the sensor to accommodate the large signal background. Furthermore, a low conversion gain from the large capacitance increases the input-referred contribution of downstream noise.

Some known imagers may utilize digital pixels in which the integration capacitor is reset when full while an in-pixel counter increments to signify to the periphery that a number of fixed charge amounts was subtracted from the integration node. However, analog or digital counters occupy a large portion of each pixel and often require complex calibration to retrieve the actual number of carriers integrated by the pixel.

Conventional imagers often adjust integration time, which is considered a "gain" term in the conversion of flux to pixel value. Such imager systems adjust the integration time based on the hottest (most responsive) parts of the scene using very high dynamic range pixels to discern the small signal on-top of a large parasitic background response.

SUMMARY

Embodiments of the disclosure provide methods and apparatus for an imaging sensor having background signal subtraction. Embodiments of an imager can achieve a large effective well while using smaller pixel capacitors than conventional imagers. In addition, unlike some known imagers, example embodiments of an imager do not require in-pixel counters or memory.

In embodiments, an imaging sensor integrates charge on a background capacitor and a comparator compares the voltage level on the background capacitor with a fixed level. When the background capacitor reaches this fixed level, the photocurrent is switched to a second signal integrating capacitor. In embodiments, the background capacitor is reset and the process continues a fixed number of times. With this arrangement, the signal integration capacitor only integrates the charge that was in addition to the charge integrated on the background capacitor. By adjusting the background capacitor integration time, one can prevent more or less of the incoming photocurrent from entering the signal integration capacitor. In embodiments, global timing is used and the number of background capacitors is identical for all pixels so as to eliminate the need for in-pixel storage.

In one aspect, a method comprises: (a) integrating photocurrent on a first capacitor; (b) after a voltage on the first capacitor reaches a threshold, directing the photocurrent to a second capacitor; (c) resetting the first capacitor; (d) repeating steps (a) through (c) a selected number of times; and (e) reading out a value on the second capacitor.

A method can further include one or more of the following features: the value on the second capacitor corresponds to a pixel, the pixel forms a part of an infrared imaging sensor, resetting the first capacitor during the reading out of the value on the second capacitor, reading out a value on the first capacitor on a last iteration of the selected number of times, a comparator to compare the voltage on the first capacitor with the threshold, the comparator is coupled to a switch that connects a photodetector to generate the photocurrent, and/or the comparator is configured to switch the photocurrent to the second capacitor when the voltage on the first capacitor reaches the threshold.

In another aspect, a system comprises: a first capacitor to integrate photocurrent; a second capacitor to which the photocurrent is directed after a voltage on the first capacitor reaches a threshold and the first capacitor is reset, wherein the first capacitor is configured to integrate the photocurrent a number of cycles and the second capacitor is configured to receive the photocurrent the number the cycles; and an output to read out a value on the second capacitor.

A system can further include one or more of the following features: the value on the second capacitor corresponds to a pixel, the pixel forms a part of an infrared imaging sensor, resetting the first capacitor during the reading out of the value on the second capacitor, reading out a value on the first capacitor on a last iteration of the selected number of times, a comparator to compare the voltage on the first capacitor with the threshold, the comparator is coupled to a switch that connects a photodetector to generate the photocurrent, and/or the comparator is configured to switch the photocurrent to the second capacitor when the voltage on the first capacitor reaches the threshold.

BRIEF DESCRIPTION OF THE DRAWINGS

The foregoing features of this disclosure, as well as the disclosure itself, may be more fully understood from the following description of the drawings in which.

DETAILED DESCRIPTION

Figure 1:
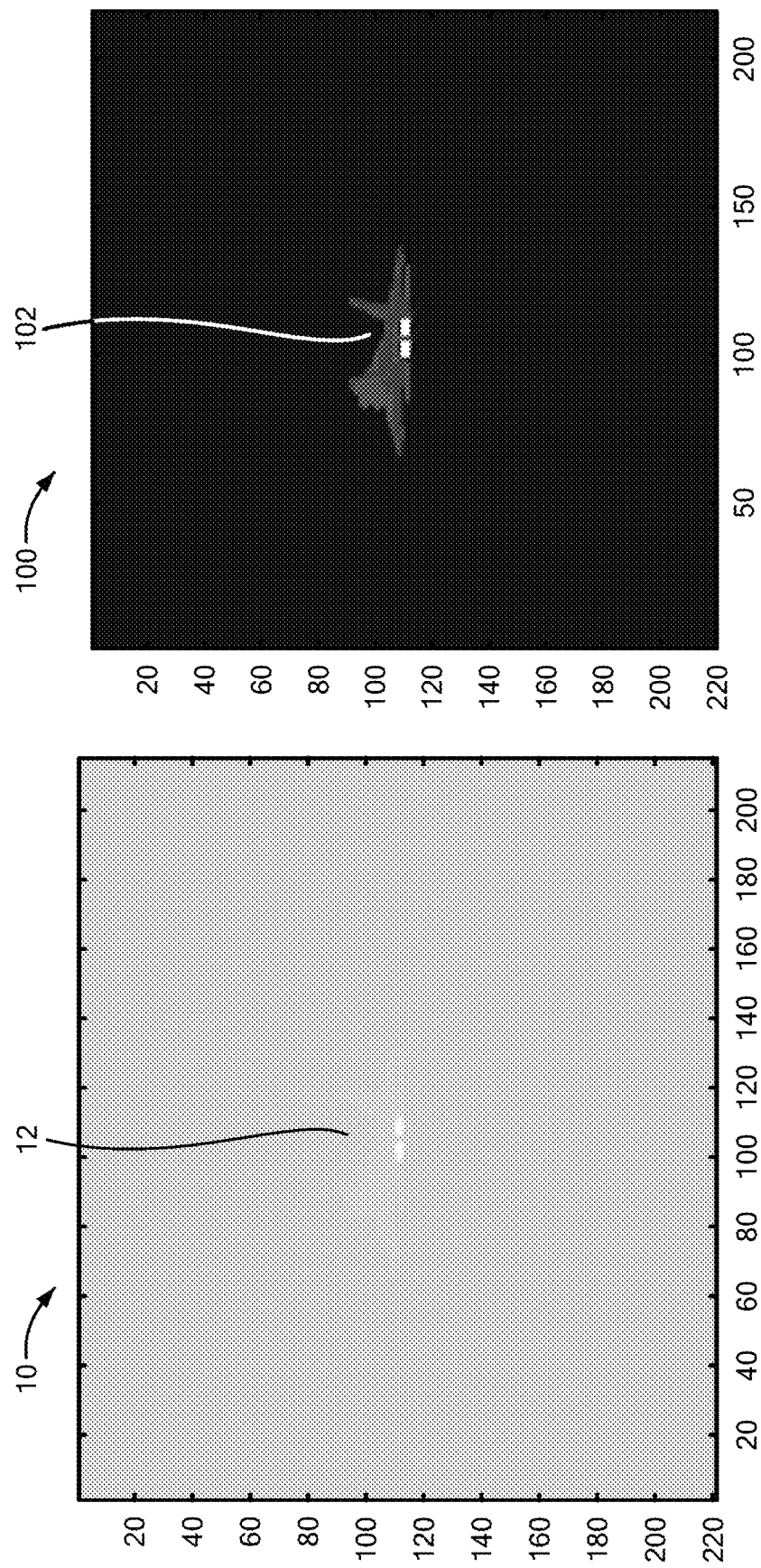
FIG. 1A is an example image generated by a conventional imaging sensor.
FIG. 1B is an example image generated by an example imaging sensor having background subtraction in accordance with illustrative embodiments of the disclosure.

FIG. 1A shows an example infrared (IR) image 10 showing a target 12, which is an aircraft in the illustrative image, generated by a conventional imaging sensor. Infrared emission from self-heating obscures the image rendering it challenging to discern the aircraft 12.

FIG. 1B shows a similar image 100 generated by an imaging sensor having background subtraction in accordance with example embodiments of the disclosure. Self-heating effects are subtracted from the image during integration so that a target 102, which is shown as an aircraft, can be readily discerned.

Figure 2:
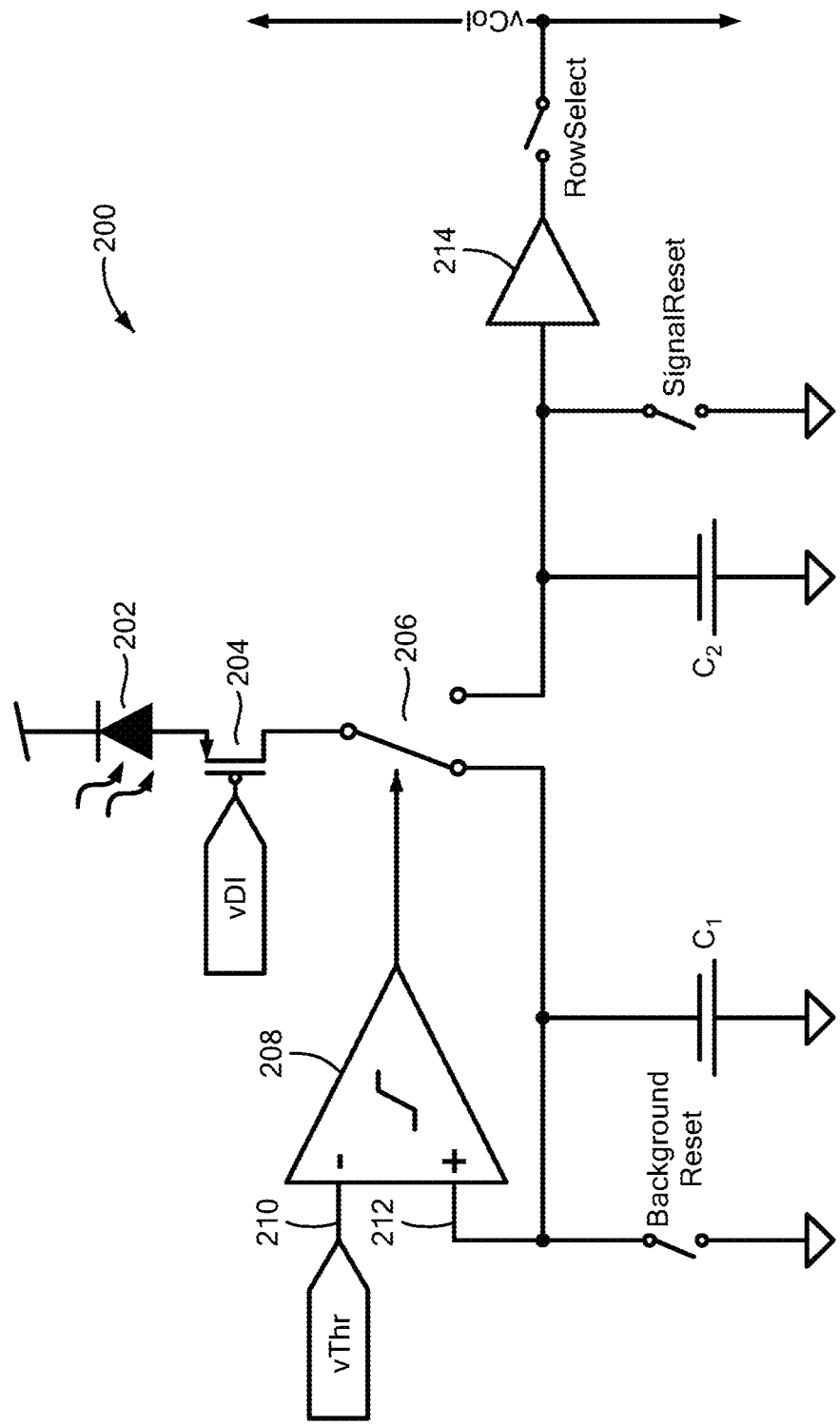
FIG. 2 is a schematic representation of an example implementation of a portion of an imaging sensor having background subtraction in accordance with illustrative embodiments of the disclosure.

FIG. 2 shows an example implementation of an imaging sensor 200 having background subtraction in accordance with illustrative embodiments of the disclosure. A photodetector 202, such as a photodiode, is coupled to a switching element 204, such as a transistor. A switch 206 has a first position that connects the photodetector 202 to a first capacitor C1, which can be considered to be a background capacitor, and a second position that connects the photodetector 202 to a second capacitor C2, which can be considered to be a signal capacitor. A comparator 208 has a first input 210 coupled to a threshold voltage Vthr and a second input 212 coupled to the first capacitor C1. In embodiments, an output of the comparator 208 can determine the position of the switch 206, as described more fully below. A buffer element 214 can be coupled between an output 216 of the pixel and the second capacitor C2.

In operation, current from the photodetector 202 can be switched between the first and second capacitors C1, C2. At the start of integration, photocurrent is integrated on the first (background) capacitor C1. The comparator 208 monitors the voltage level of the capacitor C1 and switches photocurrent from the first capacitor C1 to the second (signal) capacitor C2 when the first capacitor C1 is "full." In embodiments, at some fixed interval, the first capacitor C1 is reset and the comparator 208 causes the switch 206 to switch photocurrent to the second capacitor C2. In embodiments, the process of resetting the first capacitor C1 continues a fixed number of times at fixed intervals. At the end of the integration time, the first capacitor C1 is held in reset while the second capacitor C2 is read out sequentially.

Figure 2A:
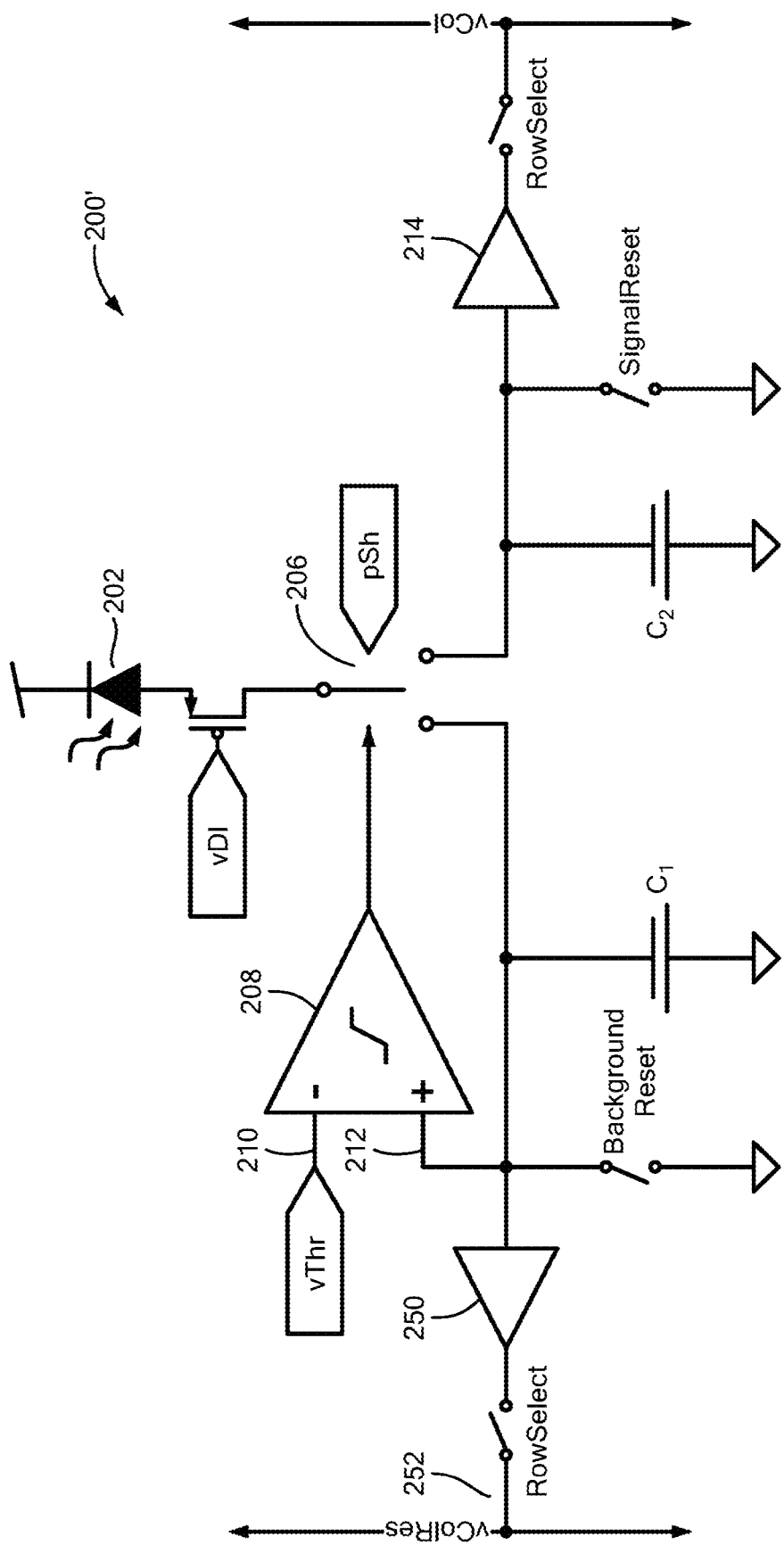
FIG. 2A is a schematic representation of an alternative implementation of a portion of an imaging sensor having background subtraction in accordance with illustrative embodiments of the disclosure.
Figure 2B:
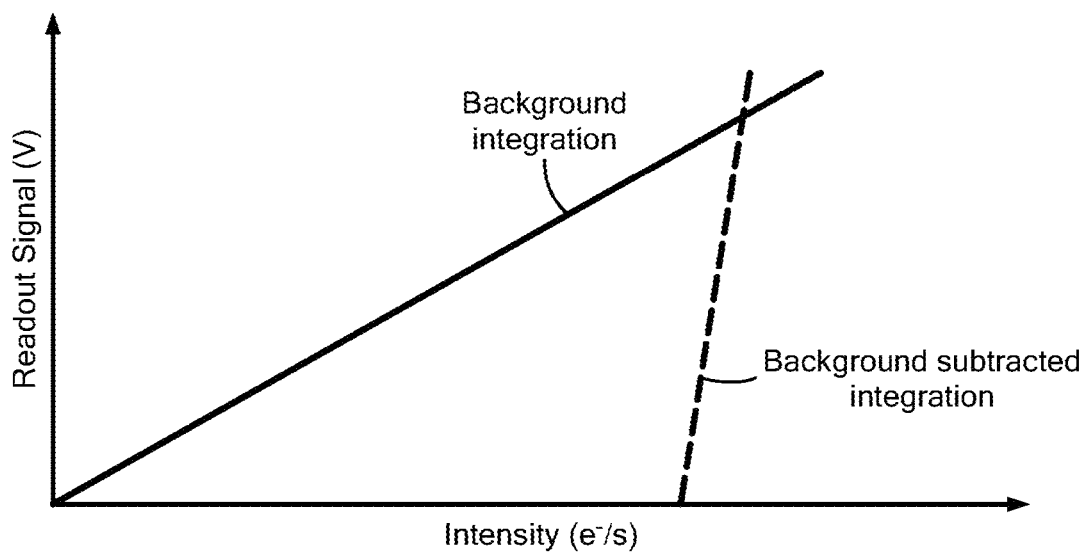
FIG. 2B is a graphical representation of signal readout versus intensity for background integration and background subtracted integration for the imaging sensor of FIG. 2A.

FIG. 2A shows an alternative embodiment that further includes a buffer element 250 and an output 252 to enable the voltage level on the first capacitor C1 to be read out at the end of the last iteration. As can be seen in FIG. 2B, this arrangement allows the background integration to accumulate to full range as a separate integration after the background subtracted integration has completed. This additional short integration allows the subtracted background intensity to be seen though the dynamic range may be relatively low.

Figure 3:
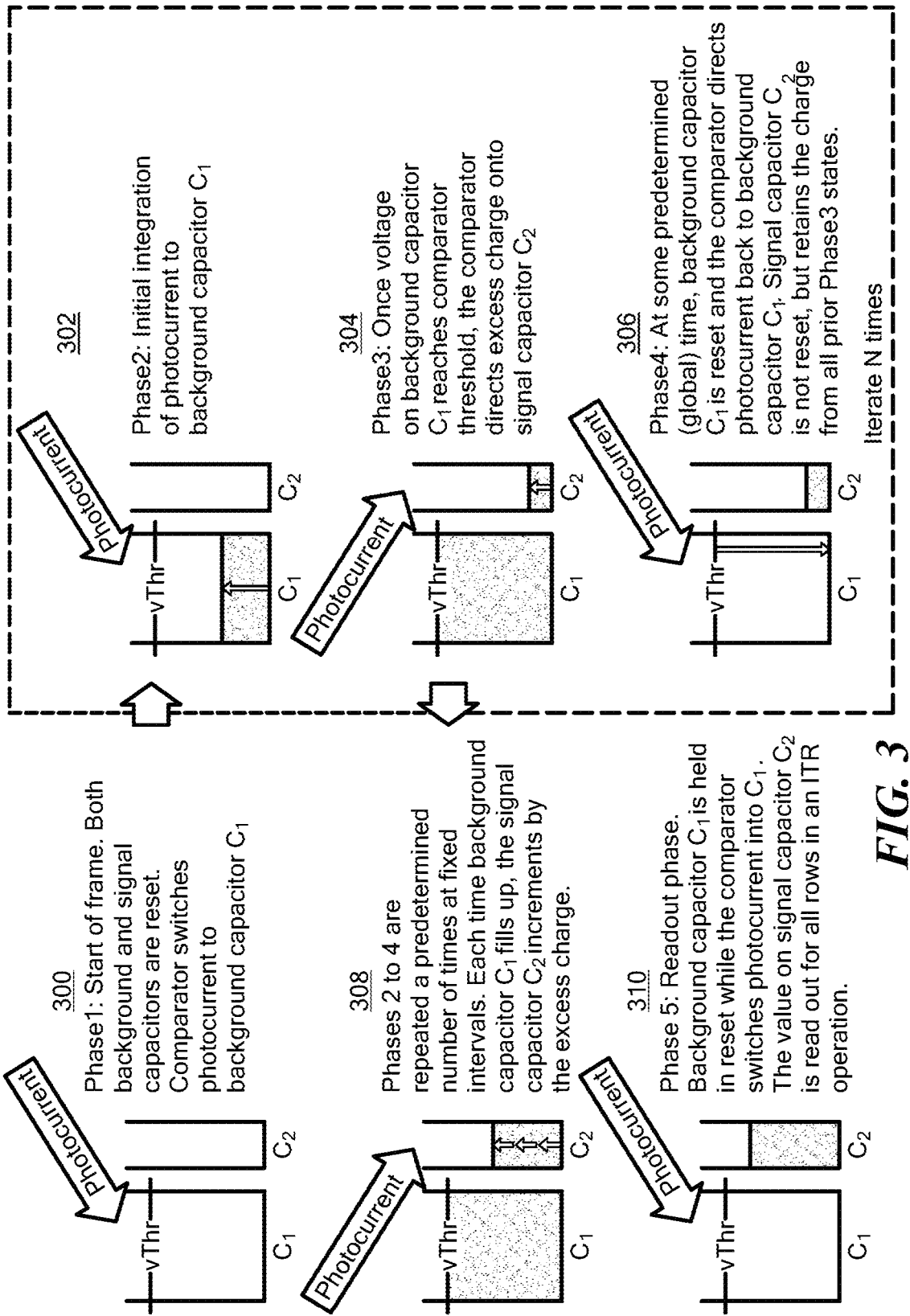
FIG. 3 shows processing phases for an example implementation of a portion of an imaging sensor having background subtraction in accordance with illustrative embodiments of the disclosure.

FIG. 3, in conjunction with FIG. 2, shows an example background subtraction process with N iterations. In phase 1 300, the first and second capacitors C1, C2 are reset. The comparator 208 controls the switch 206 to direct current from the photodetector 202 to the first (background) capacitor C1. In phase 2 302, integration of photocurrent on the first capacitor C1 begins. In phase 3 304, the voltage level on the first capacitor C1 reaches the threshold level Vthr which causes the output of the comparator 208 to transition so that the switch 206 directs excess charge onto the second (signal) capacitor C2.

In phase 4 306, at some predetermined time, the first capacitor C1 is reset and the comparator 208 again directs photocurrent integration on the first capacitor C1. The second (signal) capacitor C2 is not reset so that charge from each phase 3 into C2 is retained until readout.

As can be seen in the middle 308 on the left side of the page, the imager cycles through Phase 2 to Phase 4 for a selected number of times at fixed intervals. The second capacitor C2 increments by some amount each time the voltage level on the first capacitor C1 reaches the voltage threshold.

In Phase 5 310, the voltage level on the second (signal) capacitor C2 is read out from each row of the imager integrated circuit while the first capacitor C1 is held in reset. After readout, Phase 1 can be started again. In embodiments, an imager having background subtraction in accordance with example embodiments is provided as a readout integrated circuit (ROIC).

Figure 4:
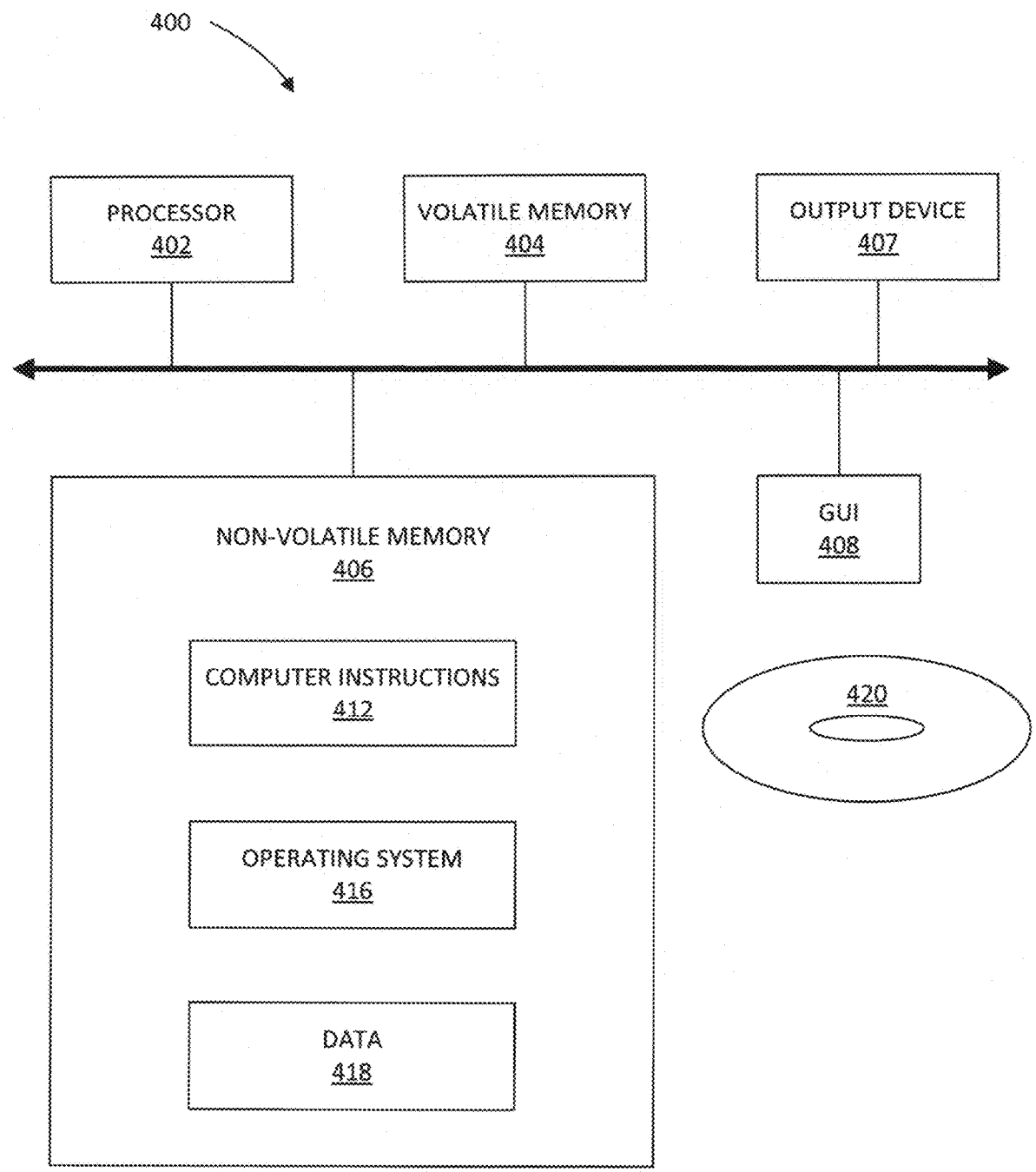
FIG. 4 is a schematic representation of an example computer than can perform at least a portion of the processing described herein.

FIG. 4 shows an exemplary computer 400 that can perform at least part of the processing described herein. For example, the computer 400 can perform processing to implement phase processing as shown in FIG. 3. The computer 400 includes a processor 402, a volatile memory 404, a non-volatile memory 406 (e.g., hard disk), an output device 407 and a graphical user interface (GUI) 408 (e.g., a mouse, a keyboard, a display, for example). The non-volatile memory 406 stores computer instructions 412, an operating system 416 and data 418. In one example, the computer instructions 412 are executed by the processor 402 out of volatile memory 404. In one embodiment, an article 420 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., RAM/ROM, CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, a CPU, special purpose logic circuitry (e.g., an FPGA (field programmable gate array), a general purpose graphical processing units (GPGPU), and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims.

All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising
   (a) integrating photocurrent on a first capacitor;
   (b) after a voltage on the first capacitor reaches a voltage threshold, directing the photocurrent to a second capacitor so that, after photocurrent is directed to the second capacitor, an excess of charge beyond a threshold level of charge associated with the voltage threshold, is integrated on the second capacitor instead of the first capacitor;
   (c) resetting the first capacitor;
   (c-1) directing the photocurrent back to the first capacitor, after resetting the first capacitor, such that the photocurrent is no longer directed to the second capacitor and is configured for integration on the first capacitor;
   (d) repeating steps (a) through (c-1) a selected number of times, wherein the second capacitor is configured to retain additional excess charge each time step (b) is reached; and
   (e) reading out a value on the second capacitor.

2. The method according to claim 1, wherein the value on the second capacitor corresponds to a pixel.

3. The method according to claim 2, wherein the pixel forms a part of an infrared imaging sensor.

4. The method according to claim 1, further including resetting the first capacitor during the reading out of the value on the second capacitor.

5. The method according to claim 1, further including reading out a value on the first capacitor on a last iteration of the selected number of times.

6. The method according to claim 1, further including employing a comparator to compare the voltage on the first capacitor with the voltage threshold.

7. The method according to claim 6, wherein the comparator is coupled to a switch that connects a photodetector to generate the photocurrent.

8. The method according to claim 7, wherein comparator is configured to switch the photocurrent to the second capacitor when the voltage on the first capacitor reaches the voltage threshold.

9. The method of claim 1, wherein, each time step (b) is reached, the stored charge on the second capacitor increments by an amount equal to the respective excess charge beyond the threshold level of charge associated with the voltage threshold.

10. The method of claim 1, wherein the second capacitor has an output value configured to increment by a predetermined amount each time the voltage on the first capacitor reaches the voltage threshold.

11. The method of claim 1, wherein step (d) continues until expiration of an integration time.

12. A system, comprising:
   a first capacitor to integrate photocurrent;
   a second capacitor to which the photocurrent is directed after a voltage on the first capacitor reaches a voltage threshold, wherein the second capacitor is configured so that, after photocurrent is directed to the second capacitor, an excess of charge, beyond a threshold level of charge associated with the voltage threshold, is integrated on the second capacitor instead of the first capacitor; and
   an output to read out a value on the second capacitor;
   wherein the first capacitor is configured to be reset after photocurrent is directed to the second capacitor, wherein after the first capacitor is reset, the first capacitor is configured to integrate the photocurrent;
   wherein the first capacitor is configured to integrate the photocurrent a number of cycles and the second capacitor is configured to receive the photocurrent directed to it during each cycle when the first capacitor reaches the voltage threshold; and
   wherein the second capacitor is configured to retain additional excess charge at each of the number of cycles.

13. The system according to claim 12, wherein the value on the second capacitor corresponds to a pixel.

14. The system according to claim 13, wherein the pixel forms a part of an infrared imaging sensor.

15. The system according to claim 12, wherein the first capacitor is reset during the reading out of the value on the second capacitor.

16. The system according to claim 12, wherein a value on the first capacitor is read out on a last one of the cycles.

17. The system according to claim 12, further including a comparator to compare the voltage on the first capacitor with the voltage threshold.

18. The system according to claim 17, wherein the comparator is coupled to a switch that connects a photodetector to generate the photocurrent.

19. The system according to claim 18, wherein the comparator is configured to switch the photocurrent to the second capacitor when the voltage on the first capacitor reaches the voltage threshold.

20. The system of claim 12, wherein the second capacitor has an output value configured to increment by a predetermined amount each time the voltage on the first capacitor reaches the voltage threshold.

* * * * *